(12) United States Patent
Tadokoro (10) Patent No.: US 6,843,276 B2
(45) Date of Patent: Jan. 18, 2005

(54) CORRUGATED TUBE AND METHOD FOR PRODUCING THE SAME

(75) Inventor: Shinichi Tadokoro, Susono (JP)

(73) Assignee: Yazaki Corporation, Tokyo (JP)

( * ) Notice: Subject to any disclaimer, the term of this patent is extended or adjusted under 35 U.S.C. 154(b) by 173 days.

(21) Appl. No.: 10/166,004

(22) Filed: Jun. 11, 2002

(65) Prior Publication Data
US 2002/0185189 A1 Dec. 12, 2002

(30) Foreign Application Priority Data
Jun. 12, 2001 (JP) ................................. P2001-177414

(51) Int. Cl.$^7$ ............................................... F16L 11/00
(52) U.S. Cl. .................... 138/121; 138/128; 138/169; 174/72 C
(58) Field of Search ............................. 138/121, 128, 138/169, 156, 110, 163, 162, 166, 167, 168, 108; 174/68.3, 72 A, 72 C, 70 C (56) References Cited

U.S. PATENT DOCUMENTS

| 578,800 | A | * | 3/1897 | Wilmot | 138/156 |
| 1,971,595 | A | * | 8/1934 | Booth | 138/128 |
| 3,336,950 | A | * | 8/1967 | Fochler | 138/121 |
| 3,583,424 | A | * | 6/1971 | Bryant | 138/156 |
| 4,513,787 | A | * | 4/1985 | Hegler et al. | 138/166 |
| 4,517,234 | A | | 5/1985 | Fisher | |
| 5,566,722 | A | * | 10/1996 | Bartholomew | 138/166 |
| 6,034,329 | A | * | 3/2000 | Kawamura | 174/102 R |
| 6,078,009 | A | * | 6/2000 | Kawamura | 174/102 R |
| 6,079,451 | A | * | 6/2000 | Hegler | 138/121 |
| 6,096,975 | A | | 8/2000 | Streit | |
| 6,323,425 | B1 | * | 11/2001 | Hegler et al. | 174/68.3 |
| 6,488,053 | B1 | * | 12/2002 | Tadokoro | 138/156 |

FOREIGN PATENT DOCUMENTS

| DE | 8903070 U | 7/1989 |
| DE | 198 27 435 A1 | 12/1999 |
| EP | 0 826 559 A2 | 3/1998 |
| GB | 2 336 475 | 10/1999 |
| JP | 2000-134762 | 5/2000 |
| JP | 2000-220772 | 8/2000 |
| JP | 2000-287330 | 10/2000 |

OTHER PUBLICATIONS

Japanese Abstract 2000220772, dated Aug. 8, 2000.
Japanese Abstract 2000287330, dated Oct. 13, 2000.

* cited by examiner

Primary Examiner—James Hook
(74) Attorney, Agent, or Firm—Sughrue Mion, PLLC

(57) ABSTRACT

In a corrugated tube, a tubular body is provided with a first slit which extends in an axial direction of the tubular body. The tubular body formed with a plurality of hollow ridge portions extending in a circumferential direction of the tubular body on an outer peripheral face of the tubular body to form a bellows portion. A lap portion is protruded from at least one of opposed end portions of the tubular body separated by the first slit, the lap portion extending along the first slit. Both end portions of each ridge portion in the circumferential direction are respectively formed with end walls closing a hollowed space thereof. At least one of the end walls of each ridge portion is provided with an opening.

10 Claims, 10 Drawing Sheets

CORRUGATED TUBE AND METHOD FOR PRODUCING THE SAME

BACKGROUND OF THE INVENTION

The present invention relates to a corrugated tube which is covered over a wire harness (a flux of electric wires) and a process for producing the same. More particularly, the present invention relates to the corrugated tube of an overlapping type in which a slit is made in an axial direction of the corrugated tube, and a lap portion provided so as to project from one of end edges of the slit is lapped on the other end edge at an inner peripheral side thereof, and the process for producing the same.

Generally, the corrugated tube which is used for bundling and protecting transmission and distribution wires for electronic appliances or wire harnesses in a motor vehicle includes a tube made of synthetic resin and provided with spiral or annular ridge portions which are continuously formed on an outer periphery of the tube so as to impart flexibility to the tube.

This corrugated tube for protecting the wire harness or the like is provided with a slit in an axial direction so that the wire harness can be easily taken into or out from the corrugated tube.

However, when the corrugated tube of this type is bent along a wiring path to be arranged, the slit may be partially opened near a middle part of a bent area, and there is such an anxiety that not only the wire harness which is contained therein may protrude from an opening in the slit requiring a trouble of inserting it again, but also the wire harness may get caught by edges formed on both sides of the slit, incurring damage on an insulating coating.

Under the circumstances, the corrugated tube is usually wrapped with an insulating tape on an outer peripheral face thereof to prevent the slit from being opened. However, it has been a problem that a work for wrapping this tape has been annoying.

In order to solve such a problem of the corrugated tube, there have been proposed various corrugated tubes of the overlapping type in which the slit would not be opened to form an opening even when the tube is bent.

Figure 12:
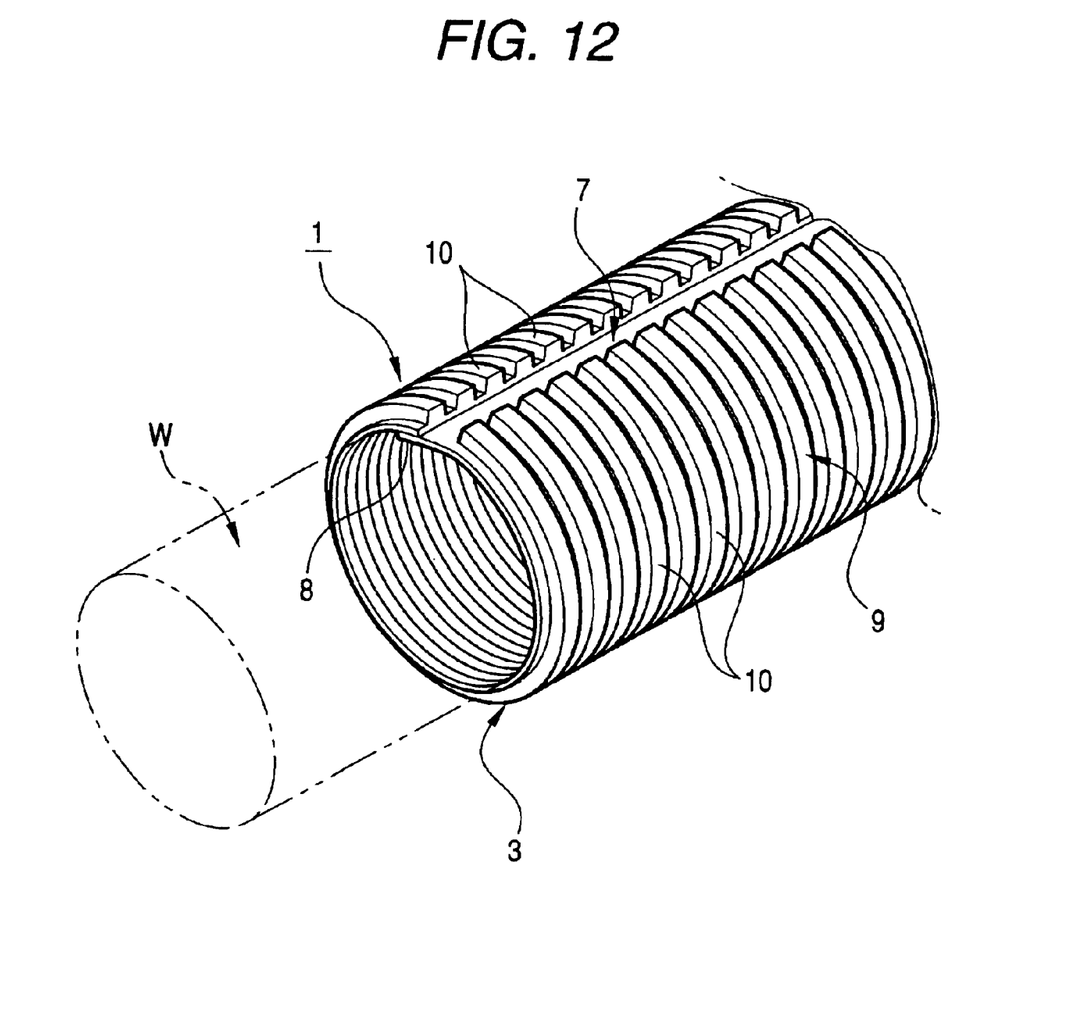
FIG. 12 is a perspective view of a part of a related corrugated tube in a state of use.
Figure 13:
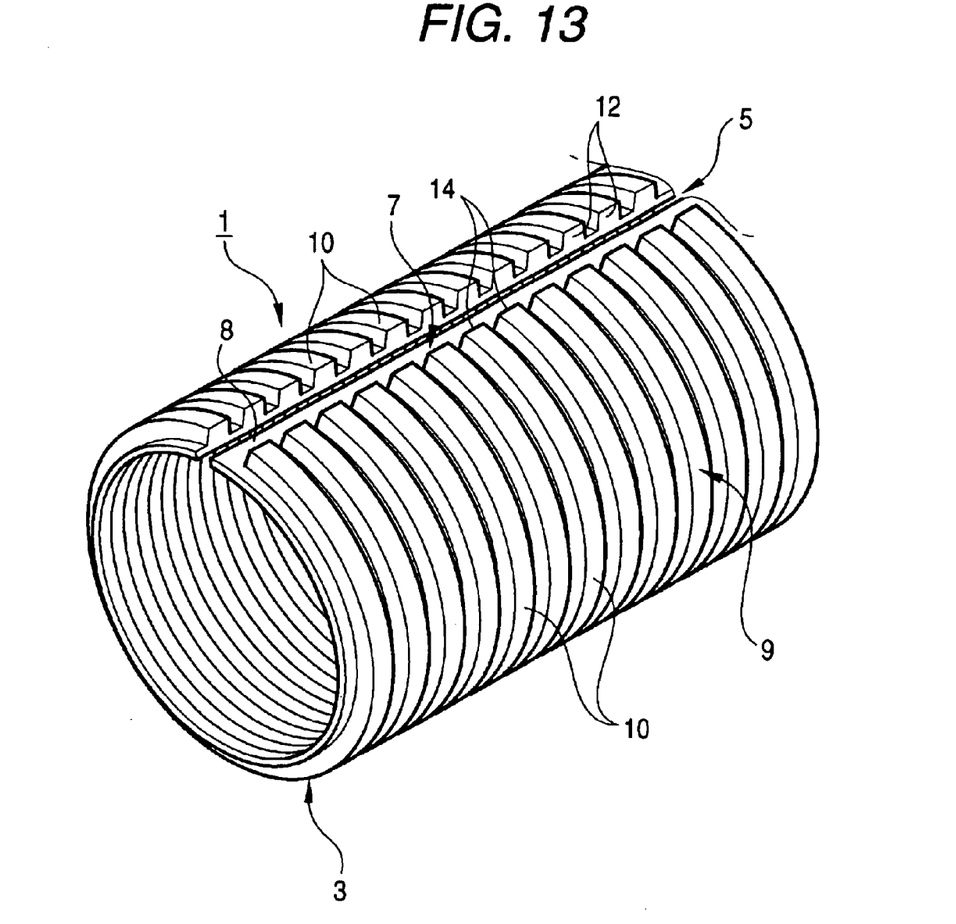
FIG. 13 is a perspective view of the part of the related corrugated tube as shown in FIG. 12.
Figure 14:
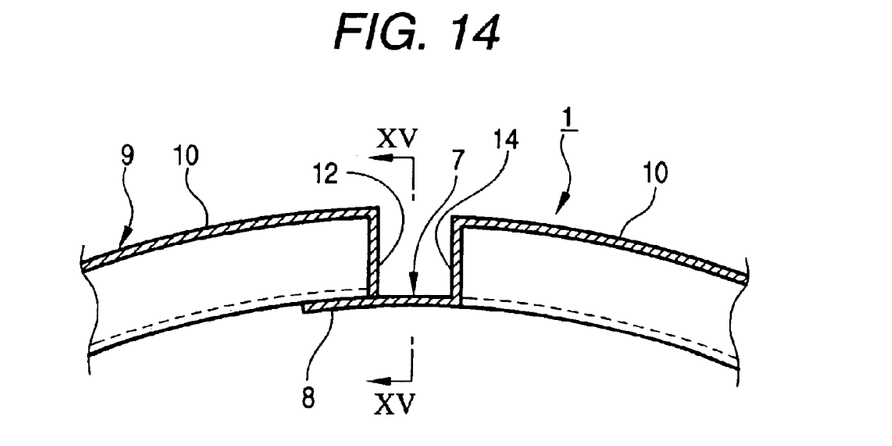
FIG. 14 is an enlarged cross sectional view of an essential part of the corrugated tube as shown in FIG. 12.

A corrugated tube 1 of the overlapping type as shown in FIGS. 12 and 13 includes a slit 5 which is formed in an axial direction of a tubular body 3, and a plate-like lap portion 8 which is provided so as to project from one of end edges on both sides of the slit 5 and lapped on the other end edge at an inner peripheral side thereof, so that a wire harness W inside the tube may not be exposed even when the tube is bent, thus eliminating the tape wrapping work.

Further, in the corrugated tube 1, the lap portion 8 to be lapped on the other end edge at the inner peripheral side is in a shape of a plate, and its end edge is rectilinear along the axial direction.

As the results, when the slit 5 is opened to receive the wire harness W, the wire harness W is not likely to get caught by the end edge of the lap portion 8, and a work for containing the harness can be conducted smoothly. Moreover, the end edge of the lap portion 8 which is lapped on the inner peripheral face of the corrugated tube 1 will not damage an insulating coating of the wire harness W contained therein.

On occasion of producing the corrugated tube 1 as described above, a tube-like molten resin is extruded from a die, as a first step, into a tubular mold having a desired molding face on its inner face, Then, corrugation of the above mentioned molding face is transferred to the tube-like molten resin by applying air pressure to the tube from inside or by evacuating the tube from outside, and thus, the long size tubular body 3 is continuously produced.

As the results, in the tubular body 3, there are integrally molded a plate-like portion 7 extending in the axial direction, and a bellows portion 9 having circular ridge portions 10 which are bulgingly formed on an outer peripheral face of the tubular body except the plate-like portion 7 and continuously provided in the axial direction.

As the next step, by forming the rectilinear slit 5 by cutting the plate-like portion 7 in the axial direction thereof, the overlap portion 8 in a plate-like shape is projectingly formed at one of end edges on both sides of the slit 5, as shown in FIG. 13.

Then, by heating for molding the tubular body 3 in such a manner that the lap portion 8 may be lapped on the other end edge at the inner peripheral side, the corrugated tube 1 of the overlapping type is produced.

However, in the corrugated tube 1 as described above, at the same time as the lap portion 8 is formed in a plate-like shape, there are inevitably formed end walls 12 and 14 at respective circumferential end portions of the ridge portions 10 which are opposed to each other on both sides of the slit 5.

Figure 15A:
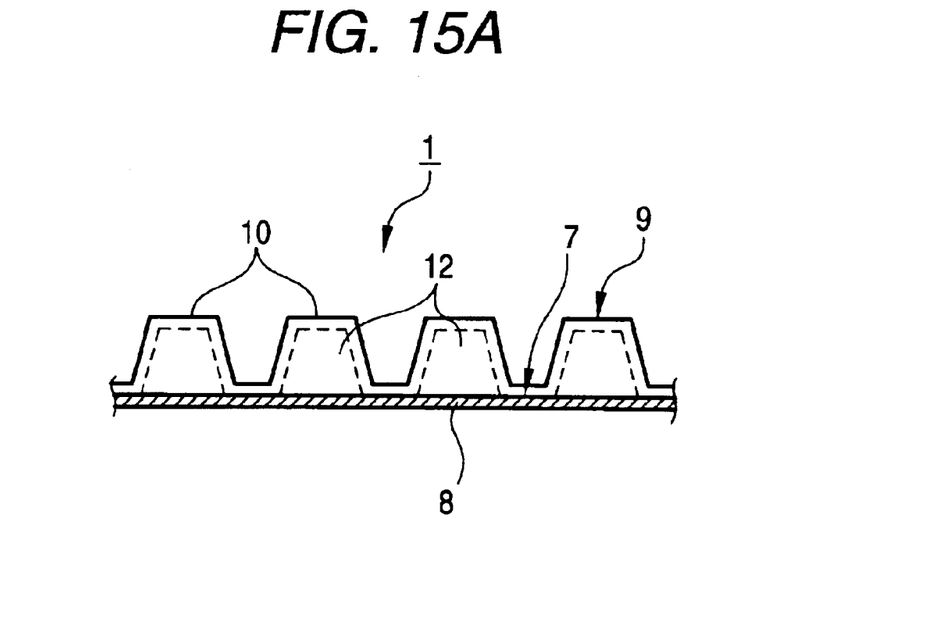
FIG. 15A is a view of the corrugated tube in a straight state as seen in a direction of arrows from a sectional plane XV—XV in FIG. 14.
Figure 15B:
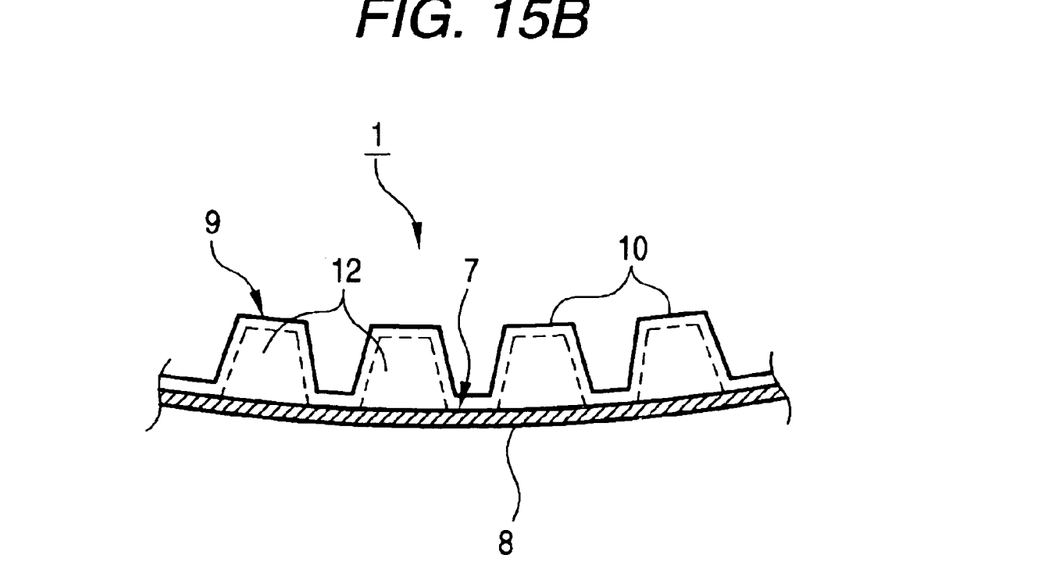
FIG. 15B is a view of the corrugated tube in a bent state as seen in a direction of arrows from a sectional plane XV—XV in FIG. 14.

Consequently, there has been a problem that when the corrugated tube 1 is bent along the wiring path, the corrugated tube 1 itself becomes difficult to be bent, and the wiring operation may be hindered. Particularly, as shown in FIG. 15, when the corrugated tube 1 is forced to be bent in a direction in which the lap portion 8 lies inwardly (in a bending direction in which the tube is downwardly protruded in FIG. 15), flexibility of the tube is not favorable due to strong repulsive forces of the end walls 12 which are parallel to the bending direction and have high rigidity.

SUMMARY OF THE INVENTION

It is therefore an object of this invention to provide a corrugated tube which can be improved in flexibility in spite of provision of a plate-like lap portion, and a method for producing the corrugated tube.

In order to achieve the above object, according to the present invention, there is provided a corrugated tube comprising:

a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and a lap portion, protruded from at least one of opposed end portions of the tubular body separated by the first slit, the lap portion extending along the first slit;

wherein both end portions of each ridge portion in the circumferential direction are respectively formed with end walls closing a hollowed space thereof, and wherein at least one of the end walls of each ridge portion is provided with an opening.

Preferably, the lap portion is provided with a second slit which extends in the circumferential direction of the tubular body.

In this configuration, the end portions of the ridge portions in which the end walls have been removed by cutting will be reduced in rigidity in spite of provision of the lap portion, and become likely to be deformed with a stress in a direction of a width of the ridge portion.

Accordingly, when the tubular body is bent, relieves from bend of the lap portion can be secured in the end portions of the ridge portions, and so, flexibility of the corrugated tube provided with the lap portion can be improved.

According to the present invention, there is also provided a corrugated tube, comprising:

a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and a lap portion, protruded from at least one of opposed end portions of the tubular body separated by the first slit, the lap portion extending along the first slit;

wherein both end portions of each ridge portion in the circumferential direction are respectively formed with end walls closing a hollowed space thereof, and wherein at least one of the both end portions of each ridge portion is provided with a third slit extending in the axial direction of the tubular body.

Preferably, at least one of the end walls of each ridge portion is provided with an opening.

Preferably, the lap portion is provided with a second slit which extends in the circumferential direction of the tubular body.

In this configuration, in the end portion of the ridge portion in which the third slit is formed along the end wall, a side wall separated from the end wall can be easily deformed with the stress in a lateral direction independently.

Therefore, when the tubular body is bent, a relief from bend of the lap portion can be secured in the end portion of the ridge portion, and the flexibility of the corrugated tube provided with the lap portion can be improved.

According to the present invention, there is also provided a method for producing a corrugated tube, comprising the steps of:

providing a tubular body formed with a plurality of hollow ridge portions extending in a circumferential direction of the tubular body on an outer peripheral face of the tubular body to form a bellows portion, the respective ridge portions having both end portions in the circumferential direction, the respective end portions having end walls closing a hollowed space thereof, and the tubular body formed with a groove extending in the axial direction of the tubular body; and cutting out the end portion of each ridge portion and a part of a bottom portion of the groove such that a cut out portion includes the end wall, and such that a remain bottom portion of the groove becomes a lap portion.

Preferably, the method for producing a corrugated tube further comprising the steps of: forming a slit on at least one of the both end portions of each ridge portion so as to extend in the axial direction of the tubular body.

Preferably, the method for producing a corrugated tube further comprising the steps of: forming a slit on the lap portion so as to extend in a circumferential direction of the tubular body.

In this method, in the same process as the related production process for forming the slit in the axial direction of the lap portion of the tubular body, the end walls of the end portions of the ridge portions at the other end edge can be removed by cutting. Therefore, the corrugated tube having improved flexibility in spite of provision of the lap portion can be produced.

According to the present invention, there is also provided a method for producing a corrugated tube, comprising the steps of:

providing a tubular body formed with a plurality of hollow ridge portions extending in a circumferential direction of the tubular body on an outer peripheral face of the tubular body to form a bellows portion, the respective ridge portions having both end portions in the Circumferential direction, the respective end portions having end walls closing a hollowed space thereof, the tubular body formed with a groove extending in the axial direction of the tubular body;

cutting out a part of a bottom part of the groove such that a remain part of the bottom part of the groove becomes a lap portion; and forming a slit on at least one of the both end portions of each ridge portion so as to extend in the axial direction of the tubular body.

Preferably, the method for producing a corrugated tube further comprising the steps of: forming a slit on the lap portion so as to extend in a circumferential direction of the tubular body.

In this method for producing the corrugated tube, in the same process as the related production process for forming the slit in the axial direction of the lap portion of the tubular body, the slit extended in the axial direction of the tubular body on the end portion of the ridge portion can be formed. Therefore, the corrugated tube having improved flexibility in spite of provision of the lap portion can be produced without incurring an increase of the production cost.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Now, a corrugated tube in an embodiment according to the present invention will be described below in detail, referring to the attached drawings.

As shown in FIGS. 1 to 4, a corrugated tube 21 in this first embodiment has a plate-like lap portion 28 which is projectingly provided at one of end edges on both sides of a slit 25 which is formed in an axial direction of a tubular body 23, and the lap portion 28 is lapped on the other end edge at an inner peripheral side thereof so that the wire harness contained inside the tube may not be exposed.

Figure 1:
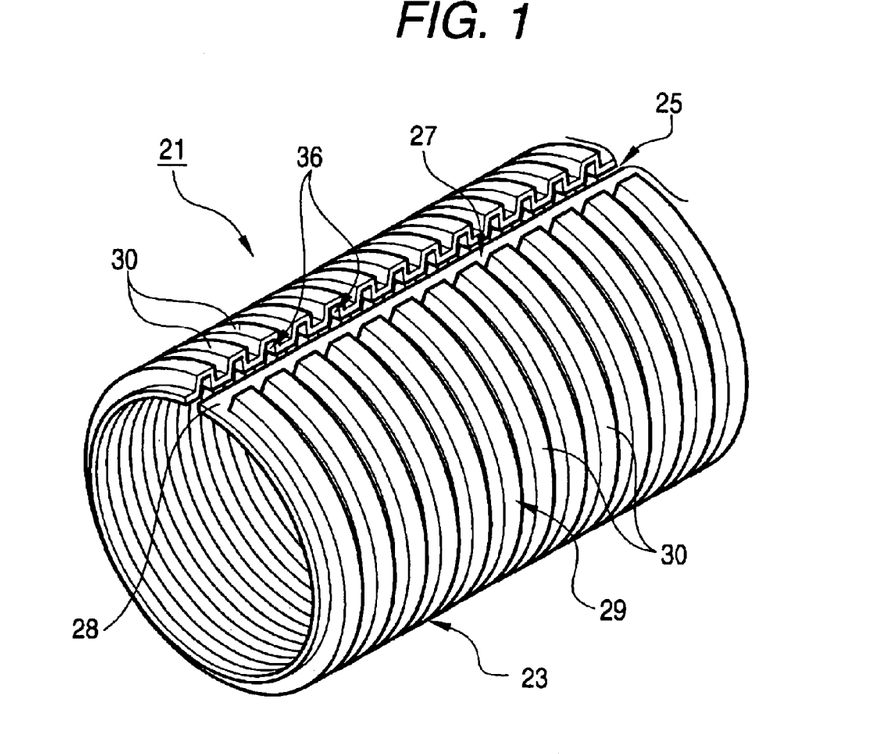
FIG. 1 is a perspective view of a part of a corrugated tube in a first embodiment according to the present invention.
Figure 2:
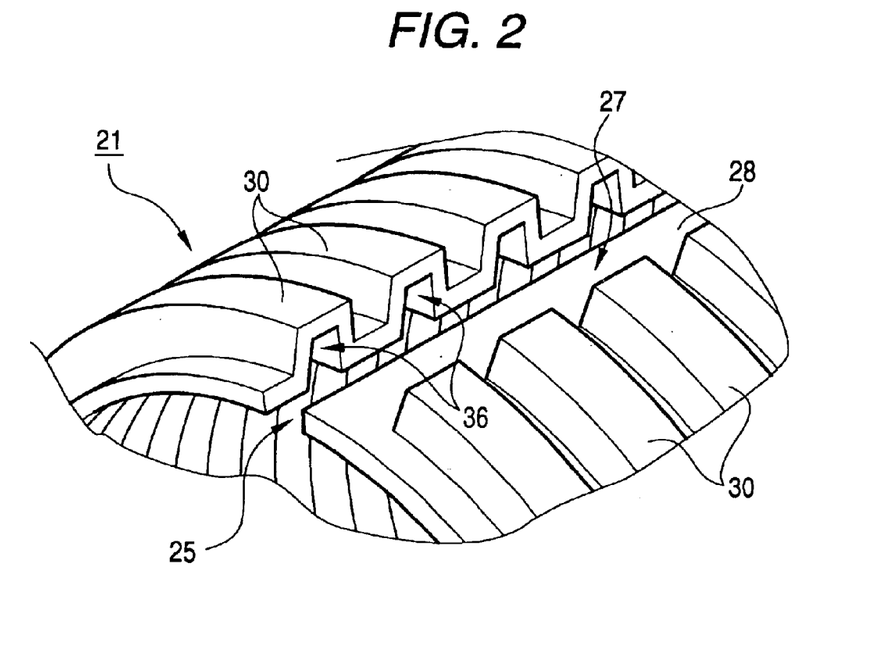
FIG. 2 is an enlarged perspective view of an essential part of the corrugated tube as shown in FIG. 1.
Figure 3:
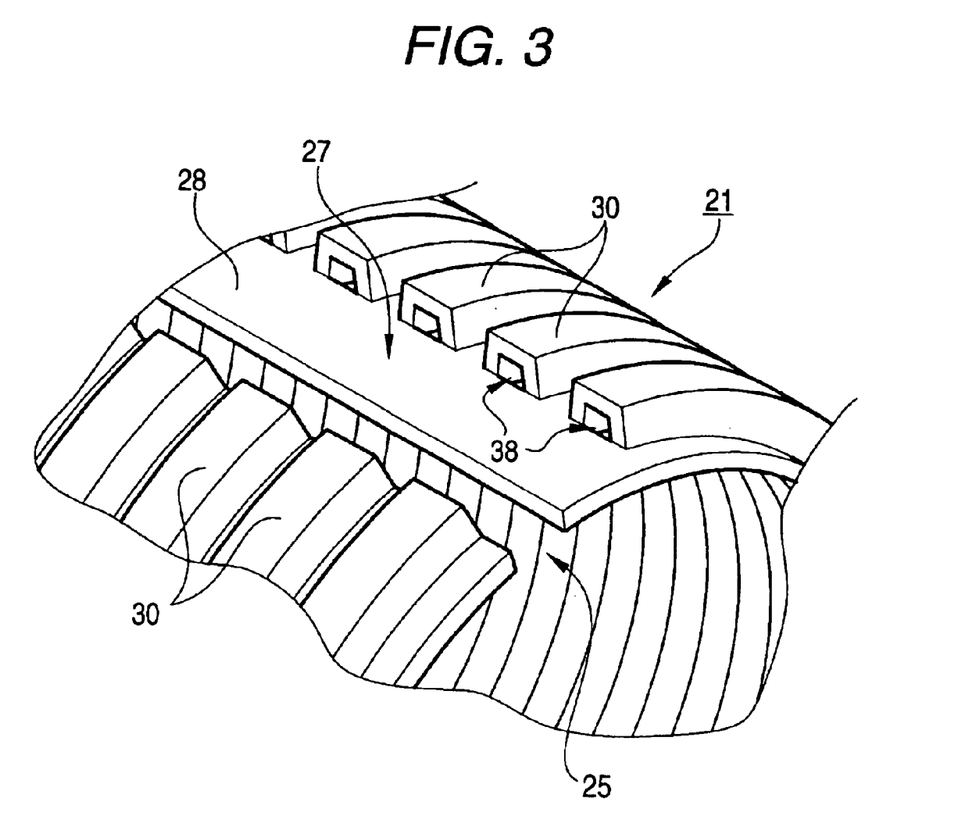
FIG. 3 is an enlarged perspective view of the essential part of the corrugated tube as shown in FIG. 1.
Figure 4:
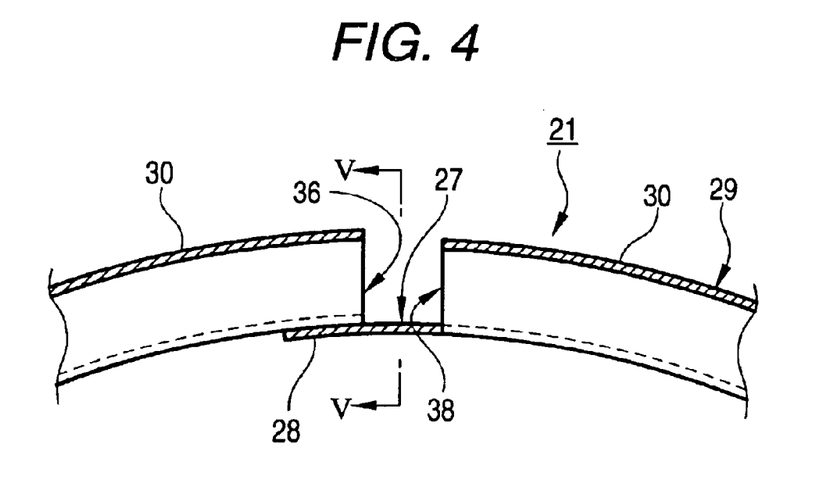
FIG. 4 is an enlarged cross sectional view of the essential part of the corrugated tube as shown in FIG. 1.

It is to be noted that the corrugated tube 21 as shown in FIGS. 1 to 3 is in a state before the tubular body 23 is heated for molding in such a manner that the lap portion 28 may be lapped on the other end edge at the inner peripheral side, and that the lap portion 28 is finally lapped on the other end edge at the inner peripheral side, as shown in FIG. 4.

Further, as shown in FIGS. 2 and 3, end walls 32 and 34 (See FIG. 7) of circumferential end portions of ridge portions 30 which are opposed to each other on both sides of the slit 25 are cut away, so that openings 36, 38 are formed.

Figure 5A:
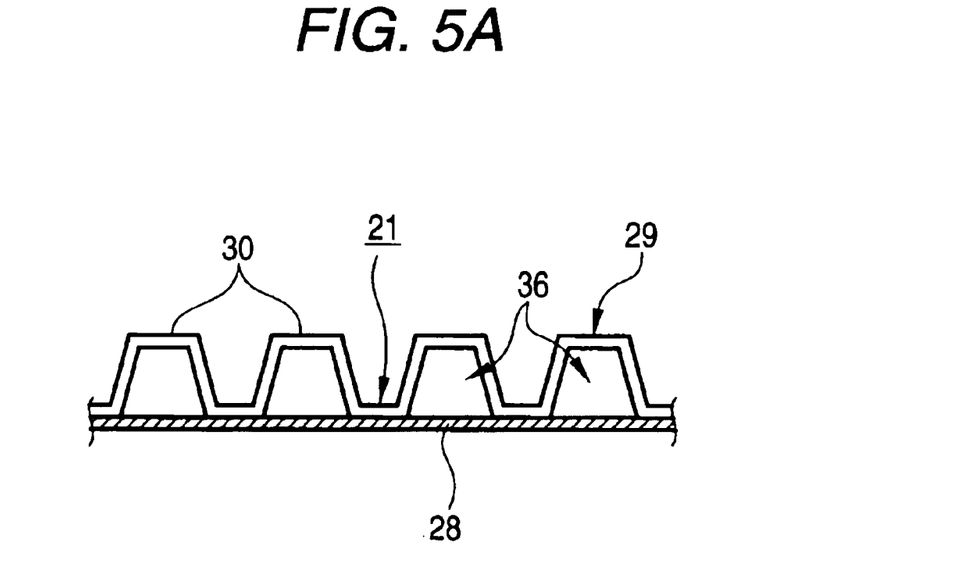
FIG. 5A is a view of the corrugated tube in a straight state as seen in a direction of arrows from a sectional plane V—V in FIG. 4.
Figure 5B:
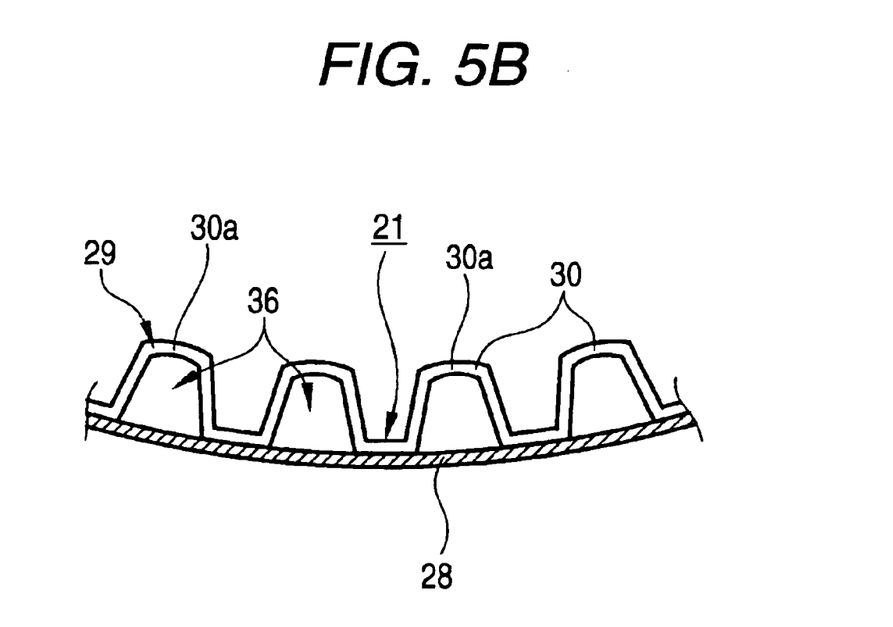
FIG. 5B is a view of the corrugated tube in a bent state as seen in a direction of arrows from a sectional plane V—V in FIG. 4.

Therefore, according to the corrugated tube 21 in this first embodiment, when the corrugated tube 21 is bent in a direction in which the lap portion 28 lies inwardly (in a bending direction in which the tube is downwardly protruded in FIGS. 5A and 5B), the circumferential end portions of the ridge portions 30 from which the end walls 32 and 34 is cut away to form the openings 36, 38 are easily deformed at top walls 30a with a stress in a direction of the width of the ridge portions 30 as shown in FIG. 5B. More specifically, since the end walls 32 and 34 which are parallel to the bending direction and have high rigidity is cut away, rigidity of the respective circumferential end portions of the ridge portions 30 will be lowered, and the ridge portions become likely to be easily deformed.

As the results, when the tubular body 23 of the corrugated tube 21 is bent, relieves from bend of the lap portion 28 can be secured in the circumferential end portions of the respective ridge portions 30, and thus, flexibility of the corrugated tube 21 can be improved in spite of provision of the plate-like lap portion 28.

In this embodiment, both the end walls 32 and 34 of the circumferential end portions of the ridge portions 30 which are opposed to each other on both sides of the slit 25 is removed by cutting. However, it is apparent that by removing at least one of the end walls 32 (or 34), the flexibility can be improved as compared with the related corrugated tube 1.

The corrugated tube 21 of the overlapping type has the lap portion 28 in a plate-like shape as shown in FIG. 1, and its end edge extends straightly in the axial direction.

Accordingly, when the slit 25 is opened to receive a wire harness which is not shown, the wire harness is not likely to get caught by the end edge of the lap portion 28, and a work for containing the harness can be conducted smoothly. Further, there will be no fear that the end edge of the lap portion 28 which is lapped on the inner peripheral face of the corrugated tube 21 may damage an insulating coating of the contained wire harness. Still further, there will be no necessity of wrapping the tube with a tape for preventing the slit 25 from being opened.

In addition, when the corrugated tube 21 is bent along the wiring path, the wiring operation can be conducted easily, because the corrugated tube 21 itself is yielding.

Then, an example of a method for producing the corrugated tube 21 will be described below, referring to FIGS. 6 and 7.

In the same manner as the related tubular body 3 shown in FIG. 13, a tube-like molten resin is extruded from a die, as a first step, into a tubular mold having a desired molding face on its inner face. Then, corrugation of the above mentioned molding face is transferred to the tube-like molten resin by applying air pressure to the tube from inside or by evacuating the tube from outside, and thus, the long size tubular body 23 is continuously produced.

Figure 6A:
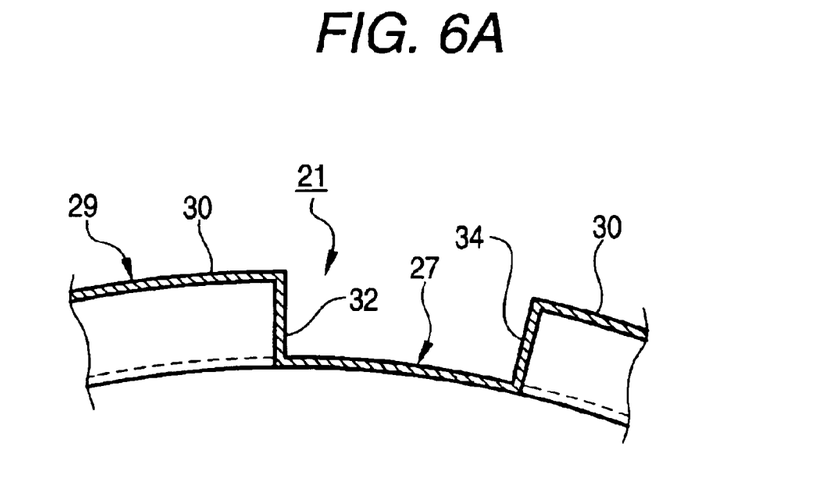
FIG. 6A is an enlarged cross sectional view of the essential part of the corrugated tube as shown in FIG. 1.
Figure 7:
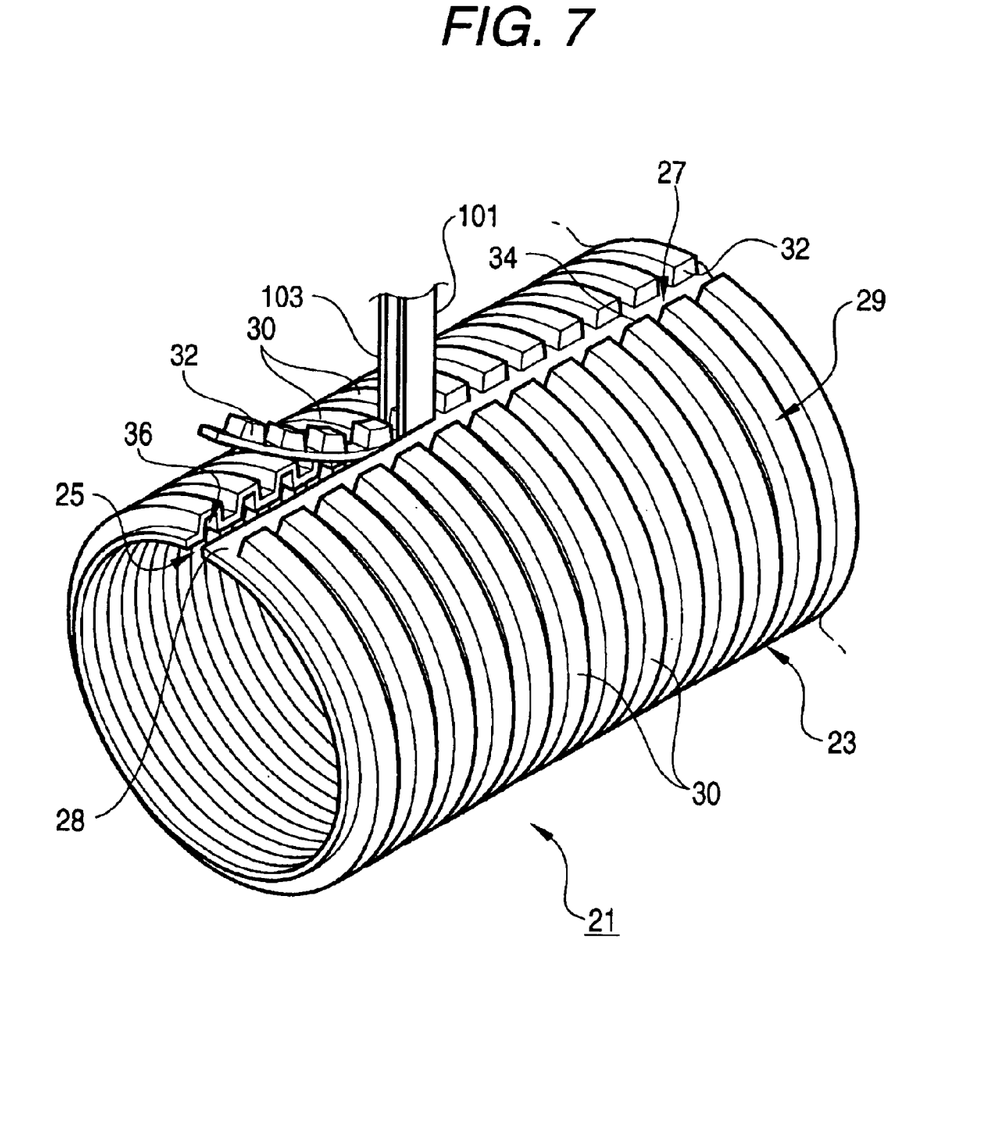
FIG. 7 is a perspective view of a part for explaining the process for producing the corrugated tube as shown in FIG. 1.

As the results, as shown in FIGS. 6A and 7, in the tubular body 23, there are integrally formed a plate-like portion 27 extending in the axial direction, and a bellows portion 29 having the circular ridge portions 30 which are bulgingly formed on an outer peripheral face Of the tubular body except the plate-like portion 27 and continuously provided in the axial direction.

Figure 6B:
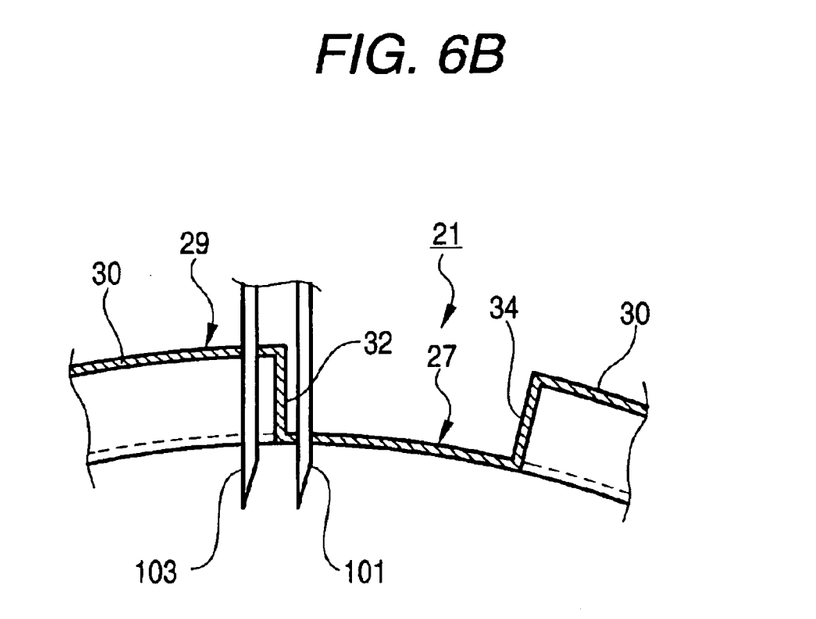
FIG. 6B is an enlarged cross sectional view of the essential part of the corrugated tube formed with a slit as shown in FIG. 1.

As the next step, as shown in FIGS. 6B and 7, the rectilinear slit 25 is formed by cutting by a slit forming cutter 101, and at the same time, the end walls 32 of the circumferential end portions of the ridge portions 30 at the other end edge are removed by cutting by an end wall removing cutter 103 which is provided together with the slit forming cutter 101.

Then, the tubular body 23 is heated for molding in such a manner that the lap portion 28 is lapped on the other end edge at the inner peripheral side, thereby to produce the corrugated tube 21 of the overlapping type.

In conclusion, according to the method for production, in the same process as the related production process for forming the plate-like lap portion 28 so as to project from one of the end edges, by forming the slit 25 in the plate-like portion 27 of the tubular body 23 in the axial direction, at least the end wall 32 of the ridge portion 30 at the other end edge can be removed. Therefore, the corrugated tube 21 in which the flexibility is improved in spite of provision of the plate-like lap portion 28 can be produced without incurring an increase of the production cost.

Figure 8:
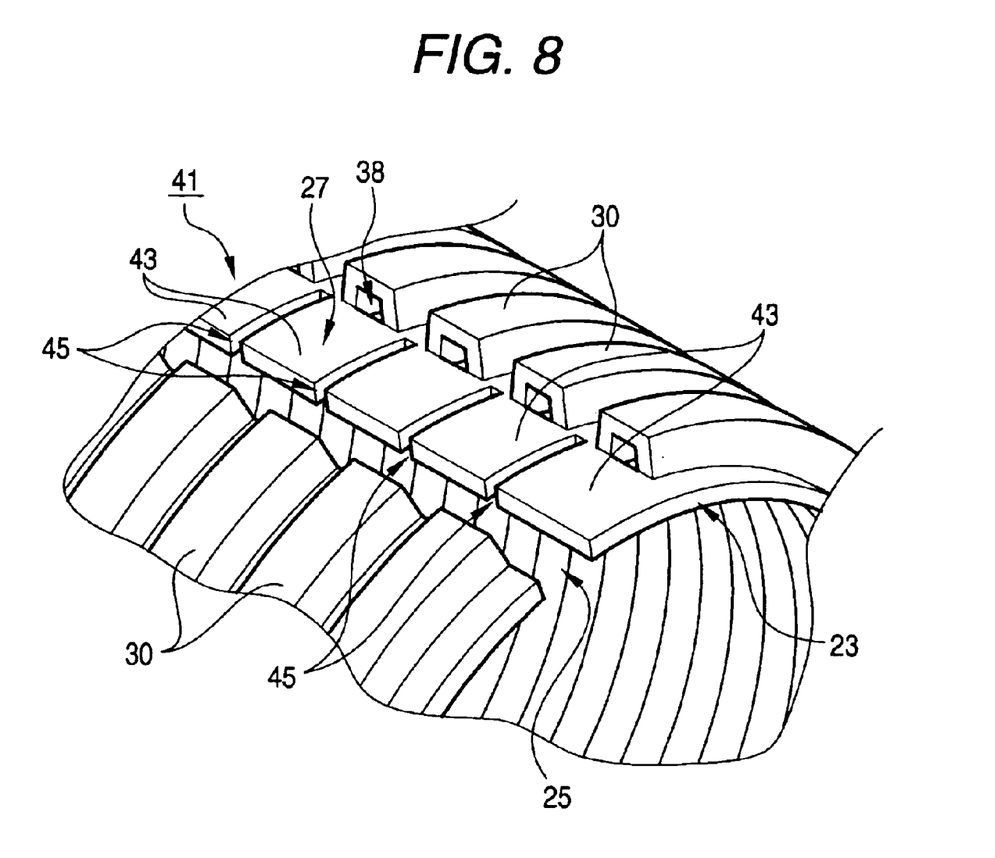
FIG. 8 is an enlarged perspective view of an essential part of the corrugated tube in a second embodiment according to the present invention.
Figure 9:
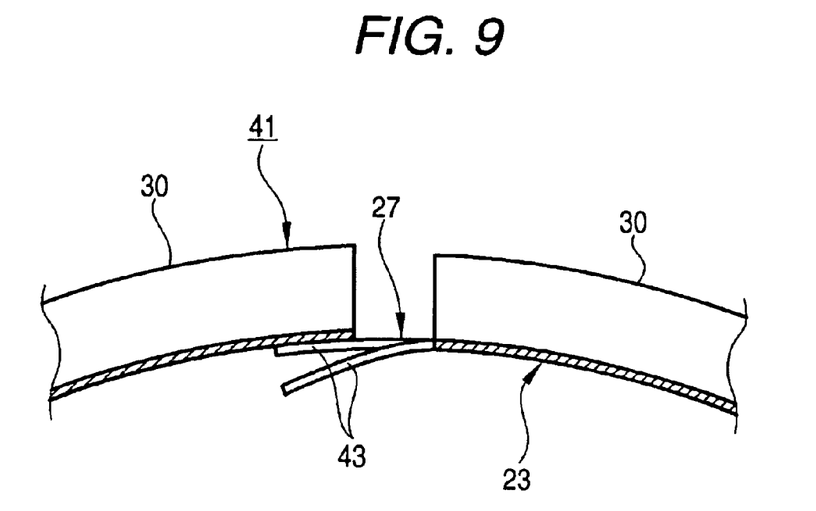
FIG. 9 is an enlarged cross sectional view of the essential part of the corrugated tube as shown in FIG. 8.

FIGS. 8 and 9 are an enlarged perspective view of an essential part of a corrugated tube 41 in a second embodiment according to the present invention, and a cross sectional view of the part, respectively.

As shown in FIG. 8, the corrugated tube 41 in this embodiment has a substantially same structure as the corrugated tube 21 in the first embodiment, except that a plurality of cutting slits 45 are formed in a circumferential direction in the plate-like portion 27 which extends in the axial direction of the tubular body 23, thereby to form a plurality of lap pieces 43 arranged in parallel.

Namely, according to the corrugated tube 41 in this embodiment, the plate-like lapping part provided on one of the end edges on both sides of the slit 25 which is formed in the axial direction of the tubular body 23, and lapped on the other end edge at the inner peripheral side includes a plurality of the lap pieces 43.

Accordingly, as shown in FIG. 9, when the slit 25 is opened to receive a wire harness which is not shown in the corrugated tube 41, the lap pieces 43 can be easily flexed, and the work for containing the harness can be conducted smoothly.

Figure 10:
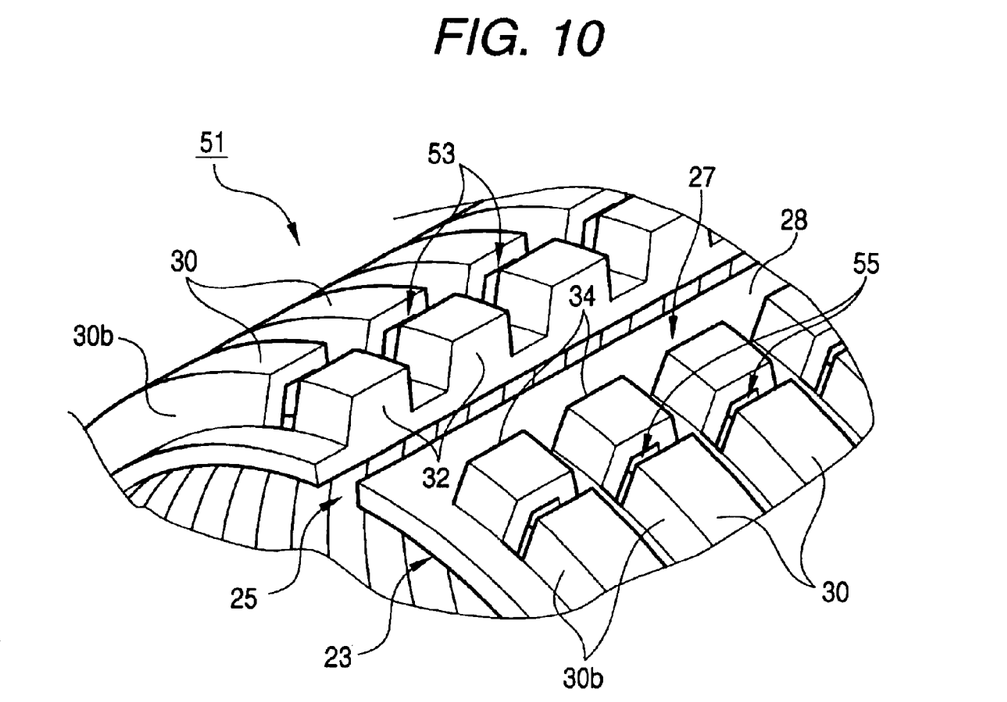
FIG. 10 is an enlarged perspective view of an essential part of a corrugated tube in a third embodiment according to the present invention.
Figure 11:
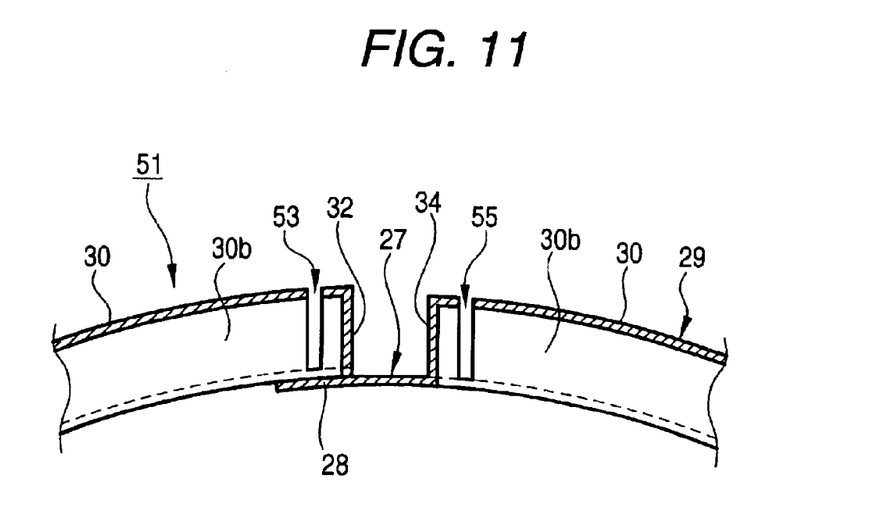
FIG. 11 is an enlarged cross sectional view of the essential part of the corrugated tube as shown in FIG. 10.

FIGS. 10 and 11 are an enlarged perspective view of an essential part of a corrugated tube 51 in a second embodiment according to the present invention, and a cross sectional view of the part, respectively.

As shown in FIG. 10, the corrugated tube 51 in this embodiment is provided with cutting slits 53 and 55 traversing the ridge portions 30 in a lateral direction along the end walls 32 and 34 in the circumferential end portions of the ridge portions 30 which are opposed to each other on both sides of the slit 25 which is provided in the axial direction of the tubular body 23.

According to the corrugated tube 51 in this embodiment, when the corrugated tube 51 is bent in a direction in which the lap portion 28 lies inwardly, in the circumferential end portions of the ridge portions 30 which are provided with the cutting slits 53 and 55 along the end walls 32 and 34, side walls 30b separated from the end walls 32 and 34 can be easily deformed independently with a stress in a lateral direction. Namely, the end walls 32 and 34 which are parallel to the bending direction and have high rigidity are separated by the cutting slits 53 and 55, and therefore, rigidity of the respective circumferential end portions of the ridge portions 30 will be reduced, and the ridge portions become likely to be easily deformed.

Accordingly, when the tubular body 23 of the corrugated tube 51 is bent, relieves from bend of the lap portion 28 can be secured in the circumferential end portions of the respective ridge portions 30, and thus, flexibility of the corrugated tube 51 can be improved in spite of provision of the plate-like lap portion 28.

Further, the corrugated tube 51 in this embodiment is so constructed that the cutting slits 53 and 55 are transversely formed by cutting in each of the ridge portions 30 in a lateral direction, and therefore, edges caused by cutting will not be exposed to the circumferential end portions of the ridge portion 30.

Accordingly, when the slit 25 is opened to receive the wire harness which is not shown, the wire harness is not likely to get caught by the edges of the cutting slits 53 and 54, and the work for containing the harness can We conducted smoothly.

In the embodiment, the cutting slits 53 and 54 are formed along the end walls 32 and 34 in the circumferential end portions of the ridge portions 30 which are opposed to each other on both sides of the slit 25. However, it is apparent that only by providing at least one cutting slit 53 (or 55) along one of the end walls 32 (or 34), the flexibility can be improved as compared with the related corrugated tube 1.

Furthermore, the cutting slit 53 formed by cutting along one of the end walls 32 in the circumferential end portions of the ridge portion 30 can be formed by cutting by a cutting cutter at the same time as the rectilinear slit 25 is formed by the slit forming cutter 101 along the axial direction of the plate-like portion 27. Specifically, in place of the end wall removing cutter 103, a cutting cutter which has a shorter edge than the end wall removing cutter 103 may be provided together with the slit forming cutter 101 thereby to form the cutting slit 53 simultaneously with formation of the slit 25.

As described above, in the same process as the related production process for providing the plate-like lap portion 28 on one of the end edges by forming the slit 25 in the axial direction of the plate-like portion 27 of the tubular body 23, at least the cutting slit 53 along the end wall 32 in the other end edge of the ridge portion 30 can be formed. Therefore, the corrugated tube 51 having improved flexibility in spite of provision of the plate-like lap portion 28 can be produced.

It goes without saying that the structures of the ridge portions and the lap portion and so on in the corrugated tube according to the present invention, and the production method by removing the end wall by the cutter and the cutting cutter are not limited to the description of the embodiments, but various modifications can be made according to concept of the present invention.

What is claimed is:

1. A corrugated tube, comprising:

a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and a lap portion, protruded from at least one of opposed end portions of the tubular body separated by the first slit, the lap portion extending along the first slit;

wherein both end portions of each ridge portion in the circumferential direction are respectively formed with end walls closing a hollowed space thereof, and wherein the end walls of each ridge portion disposed adjacent to the lap portion is provided with an opening.

2. The corrugated tube as set forth in claim 1, wherein the lap portion is provided with a second slit which extends in the circumferential direction of the tubular body.

3. A corrugated tube, comprising:

a tubular body, provided with a first slit which extends in an axial direction of the tubular body, and the tubular body formed with a plurality of hollow ridge portions extending in a circumferential direction of the tubular body on an outer peripheral face of the tubular body to form a bellows portion, and a lap portion, protruded from at least one of opposed end portions of the tubular body separated by the first slit, the lap portion extending along the first slit;

wherein both end portions of each ridge portion in the circumferential direction are respectively formed with end walls closing a hollowed space thereof, and wherein at least one of the both end portions of each ridge portion is provided with an aperture slit extending in the axial direction of the tubular body so that an inner portion of the corrugated tube is exposed through the aperture slit when assembly of the corrugated tube is completed.

4. The corrugated tube as sat forth in claim 3, wherein at least one of the end walls of each ridge portion is provided with an opening.

5. The corrugated tube as set forth in claim 3, wherein the lap portion is provided with a second slit which extends in the circumferential direction of the tubular body.

6. A method for producing a corrugated tube, comprising the steps of:

providing a tubular body formed with a plurality of hollow ridge portions extending in a circumferential direction of the tubular body on an outer peripheral face of the tubular body to form a bellows portion, the respective ridge portions having both end portions in the circumferential direction, the respective end portions having end walls closing a hollowed space thereof and the tubular body formed with a groove extending in the axial direction of the tubular body; and cutting out the end portion of each ridge portion and a part of a bottom portion of the groove such that a cut out portion includes the end wall, and such that a remaining bottom portion of the groove becomes a lap portion.

7. The method for producing the corrugated tube as set forth in claim 6, further comprising the steps of:

forming a slit on at least one of the both end portions of each ridge portion so as to extend in the axial direction of the tubular body.

8. The method for producing the corrugated tube as set forth in claim 6, further comprising the steps of:

forming a slit on the lap portion so as to extend in a circumferential direction of the tubular body.

9. A method for producing a corrugated tube, comprising the steps of:

providing a tubular body formed with a plurality of hollow ridge portions extending in a circumferential direction of the tubular body on an outer peripheral face of the tubular body to form a bellows portion, the respective ridge portions having both end portions in the circumferential direction, the respective end portions having end walls closing a hollowed space thereof, the tubular body formed with a groove extending in the axial direction of the tubular body;

cutting out a part of a bottom part of the groove such that a remain part of the bottom part of the groove becomes a lap portion; and forming an aperture slit on at least one of the both end portions of each ridge portion so as to extend in the axial direction of the tubular body so that an inner portion of the corrugated tube is exposed through the aperture slit when assembly of the corrugated tube is completed.

10. The method of producing the corrugated tube as set forth in claim 9, further comprising the steps of:

forming a slit on the lap portion so as to extend in a circumferential direction of the tubular body.

* * * * *